(12) United States Patent
Toda

(10) Patent No.: US 6,593,917 B2
(45) Date of Patent: Jul. 15, 2003

(54) ULTRASONIC TOUCH PANEL SYSTEM

(76) Inventor: Kohji Toda, 1-49-18 Futaba, Yokosuka (JP), 239-0814

( * ) Notice: Subject to any disclaimer, the term of this patent is extended or adjusted under 35 U.S.C. 154(b) by 365 days.

(21) Appl. No.: 09/747,414

(22) Filed: Dec. 19, 2000

(65) Prior Publication Data

US 2002/0075242 A1 Jun. 20, 2002

(51) Int. Cl.$^7$ ................................................ G09G 5/00
(52) U.S. Cl. ........................ 345/173; 345/176; 345/177; 178/18.01; 178/18.03; 178/18.04
(58) Field of Search ................................ 345/173–174, 345/176–177; 178/18.01–18.04

(56) References Cited

U.S. PATENT DOCUMENTS

| 5,986,224 A | * 11/1999 | Kent | 178/18.04 |
| 5,994,817 A | * 11/1999 | Toda | 310/313 R |

* cited by examiner

Primary Examiner—Bipin Shalwala
Assistant Examiner—Leonid Shapiro

(57) ABSTRACT

An ultrasonic touch panel system comprises a nonpiezoelectric plate, first- and second transducer-units, first- and second detecting-units, and a signal analyzer. The first transducer-unit consists of at least two input interdigital electrodes Txi (i=1, 2, ..., m), at least two electrode groups Gxi (i=1, 2, ..., m), first- and second piezoelectric substrates, and at least two uniting terminals Uxj (j=1, 2, ..., n). When a first input electric signal is applied to two neighbors of the input interdigital electrodes Txi, a first SAW is excited in the first piezoelectric substrate, respectively, and is transmitted to the second piezoelectric substrate along the upper end surface of the nonpiezoelectric plate. The first SAW is transduced to a first output electric signal at the output interdigital electrodes Rxaj and Rxbj. If touching on the upper end surface of the nonpiezoelectric plate, a first delayed electric signal appears at one of the uniting terminals Uxj, and is converted into a first burst-signal via the first detecting-unit. A touch position is sensed in terms of an amplitude condition of the first burst-signal and that of a second burst-signal caused from a second input electric signal at the second transducer-unit.

7 Claims, 7 Drawing Sheets

ULTRASONIC TOUCH PANEL SYSTEM

BACKGROUND OF THE INVENTION

1. Field of the Invention

The present invention relates to an ultrasonic touch panel system for sensing a touch position on a nonpiezoelectric plate by means of using first- and second transducer-units, first- and second detecting-units, and a signal analyzer.

2. Description of the Prior Art

Conventional touch panels include, in general, a wedge-shaped transducer for vibrating a nonpiezoelectric plate indirectly, or a piezoelectric thin film transducer for vibrating a nonpiezoelectric plate directly. Such conventional touch panels detect an output electric signal, which disappears in response to a disappearance of an ultrasound on a nonpiezoelectric plate by touching thereon, and sense a touch position from a disappearance of the output electric signal. Thus, conventional touch panels cause a high voltage operation with a high power consumption, and a large-scale circuit with a complicated structure.

SUMMARY OF THE INVENTION

An object of the present invention is to provide an ultrasonic touch panel system capable of detecting first- and second delayed electric signals by touching a nonpiezoelectric plate with a high sensitivity and a quick response time.

Another object of the present invention is to provide an ultrasonic touch panel system excellent in manufacturing.

Another object of the present invention is to provide an ultrasonic touch panel system operating under low electric power consumption with low voltage.

A still other object of the present invention is to provide an ultrasonic touch panel system having a small-sized circuit with a simple structure which is very light in weight.

According to one aspect of the present invention there is provided an ultrasonic touch panel system comprising a nonpiezoelectric plate, first- and second transducer-units, first- and second detecting-units, and a signal analyzer connected to the first- and second detecting-units. The first transducer-unit consists of at least two input interdigital electrodes Txi (i=1, 2, ..., m), at least two electrode groups Gxi (i=1, 2, ..., m) corresponding with the input interdigital electrodes Txi, respectively, first- and second piezoelectric substrates, and at least two uniting terminals Uxj (i=1, 2, ..., n). The input interdigital electrodes Txi and the electrode groups Gxi are formed on first- and second edges, respectively, of an upper end surface of the nonpiezoelectric plate. The first- and second piezoelectric substrates are cemented on the input interdigital electrodes Txi and the electrode groups Gxi, respectively. Two neighbors of the electrode groups Gxi consist of at least two output interdigital electrodes Rxaj (j=1, 2, ..., n) and at least two output interdigital electrodes Rxbj (j=1, 2, ..., n), respectively. The output interdigital electrodes Rxaj have the reverse electrode-finger directions from the output interdigital electrodes Rxbj. The uniting terminals Uxj are connected to the output interdigital electrodes Rxaj, respectively, and also to the output interdigital electrodes Rxbj, respectively. The second transducer-unit has the same construction as the first transducer-unit, and consists of at least two input interdigital electrodes Tyi (i=1, 2, ..., m), at least two electrode groups Gyi (i=1, 2, ..., m), third- and fourth piezoelectric substrates, and at least two uniting terminals Uyj (j=1, 2, ..., n). The input interdigital electrodes Tyi and the electrode groups Gyi are formed on third- and fourth edges, respectively, of the upper end surface of the nonpiezoelectric plate. The third and fourth piezoelectric substrates are cemented on the input interdigital electrodes Tyi and the electrode groups Gyi, respectively. Two neighbors of the electrode groups Gyi consist of at least two output interdigital electrodes Ryaj (j=1, 2, ..., n) and at least two output interdigital electrodes Rybj (j=1, 2, ..., n), respectively. The output interdigital electrodes Ryaj have the reverse electrode-finger directions from the output interdigital electrodes Rybj. The uniting terminals Uyj are connected to the output interdigital electrodes Ryaj, respectively, and also to the output interdigital electrodes Rybj, respectively. The first detecting-unit consists of a fifth piezoelectric substrate, first-, second-, and third interdigital electrode pairs formed on the fifth piezoelectric substrate, and a first synchronizing device. The second detecting-unit has the same construction as the first detecting-unit, and consists of a sixth piezoelectric substrate, fourth-, fifth-, and sixth interdigital electrode pairs formed on the sixth piezoelectric substrate, and a second synchronizing device.

When a first input electric signal is applied to two neighbors of the input interdigital electrodes Txi simultaneously, a first surface acoustic wave (SAW) is excited in the first piezoelectric substrate, The first SAW is transmitted to the second piezoelectric substrate along the upper end surface of the nonpiezoelectric plate, and transduced to a first output electric signal at the output interdigital electrodes Rxaj and Rxbj, respectively. Thus, i×j first-SAW lanes in all are formed between the input interdigital electrodes Txi and the electrode groups Gxi. In the same way, i×j second-SAW lanes in all are formed between the input interdigital electrodes Tyi and the electrode groups Gyi.

If touching nowhere on the upper end surface of the nonpiezoelectric plate, no delayed electric signal appears at all the uniting terminals. However, if touching anywhere on the upper end surface of the nonpiezoelectric plate, a first delayed electric signal appears at one of the uniting terminals Uxj, and a second delayed electric signal appears at one of the uniting terminals Uyj. The first delayed electric signal arrives not only at the signal analyzer directly, but also at the signal analyzer indirectly via the first detecting-unit. As a result, the first delayed electric signal is converted into a first burst-signal. An amplitude condition of the first burst-signal indicates which of two neighbors of the electrode groups Gxi causes the first delayed electric signal appearing at one of the uniting terminals Uxj. In the same way, the second delayed electric signal is converted into a second burst-signal. An amplitude condition of the second burst-signal indicates which of two neighbors of the electrode groups Gyi causes the second delayed electric signal appearing at one of the uniting terminals Uyj. Thus, it is possible to sense the touch position by distinguishing a phase condition of the first delayed electric signal appearing at one of the uniting terminals Uxj and that of the second delayed electric signal appearing at one of the uniting terminals Uyj.

According to another aspect of the present invention there is provided a piezoelectric substrate with a window-flame shape in place of the first-, second-, third-, and fourth piezoelectric substrates.

According to another aspect of the present invention there are provided first-, second-, third-, fourth-, fifth-, and sixth piezoelectric substrates, made of a piezoelectric ceramic, respectively, the polarization axis thereof being parallel to the thickness direction thereof.

According to another aspect of the present invention there is provided a transparent nonpiezoelectric plate.

According to another aspect of the present invention there are provided first-, second-, third-, and fourth piezoelectric substrates having a thickness smaller than an interdigital periodicity of the input interdigital electrodes Txi and Tyi. In addition, there is provided a nonpiezoelectric plate having a thickness larger than three times the interdigital periodicity.

According to other aspect of the present invention there is provided an ultrasonic touch panel system, wherein the phase velocity of the surface acoustic wave on the nonpiezoelectric plate alone is higher than that in the first-, second-, third-, and fourth piezoelectric substrates alone.

According to a further aspect of the present invention there are provided a first switch connected with the input interdigital electrodes Txi, and a second switch connected with the input interdigital electrodes Tyi.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
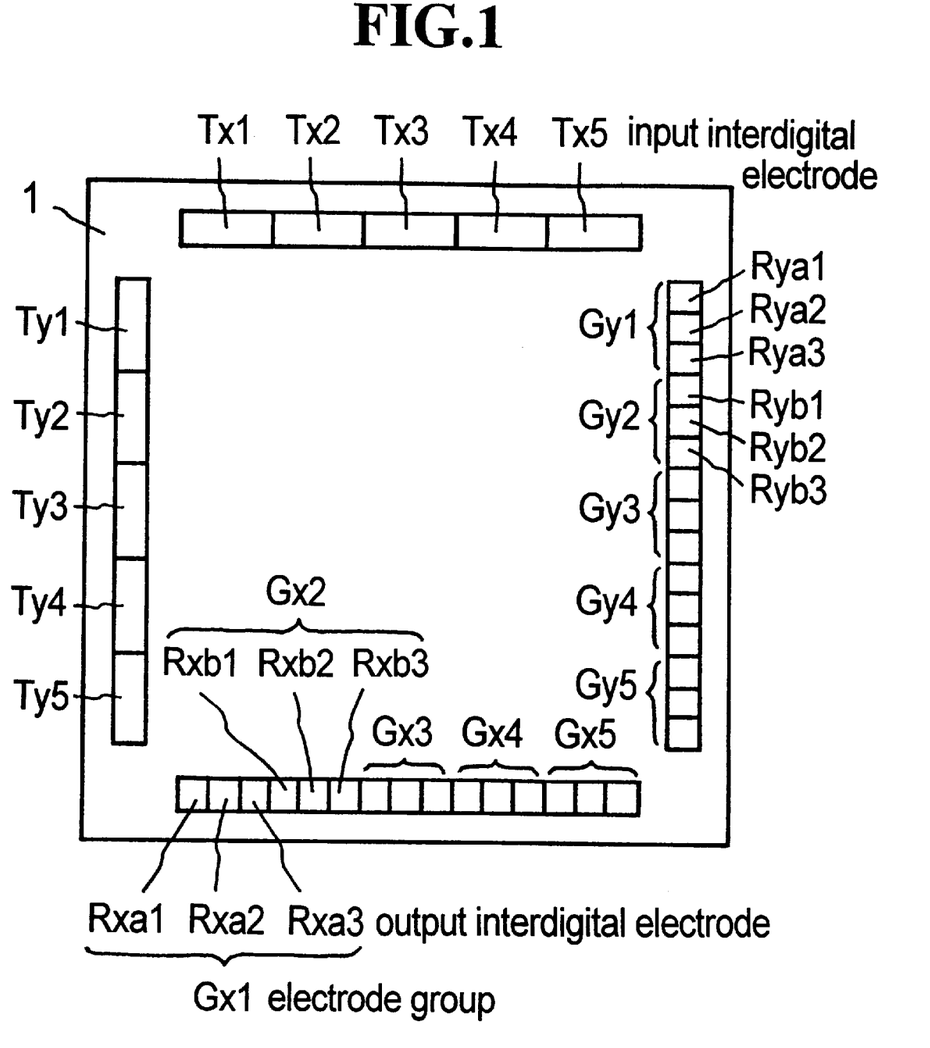
FIG. 1 shows a top plan view of a panel section, of an ultrasonic touch panel system, according to an embodiment of the present invention.

FIG. 1 shows a top plan view of a panel section, of an ultrasonic touch panel system, according to an embodiment of the present invention. The ultrasonic touch panel system comprises a first transducer-unit, a second transducer-unit, a first detecting-unit, a second detecting-unit, nonpiezoelectric plate 1, signal analyzer 2, first switch 3, and second switch 4. The first transducer-unit comprises first piezoelectric substrate 5, second piezoelectric substrate 6, input interdigital electrodes (Tx1, Tx2, Tx3, Tx4 and Tx5), electrode groups (Gx1, Gx2, Gx3, Gx4 and Gx5), and uniting terminals (Ux1, Ux2 and Ux3). Electrode groups (Gx1, Gx3 and Gx5) consist of output interdigital electrodes (Rxa1, Rxa2 and Rxa3), respectively. Electrode groups (Gx2 and Gx4) consist of output interdigital electrodes (Rxb1, Rxb2 and Rxb3), respectively. The second transducer-unit comprises third piezoelectric substrate 7, fourth piezoelectric substrate 8, input interdigital electrodes (Ty1, Ty2, Ty3, Ty4 and Ty5), electrode groups (Gy1, Gy2, Gy3, Gy4 and Gy5), and uniting terminals (Uy1, Uy2 and Uy3). Electrode groups (Gy1, Gy3 and Gy5) consist of output interdigital electrodes (Rya1, Rya2 and Rya3), respectively. Electrode groups (Gy2 and Gy4) consist of output interdigital electrodes (Ryb1, Ryb2 and Ryb3), respectively. Nonpiezoelectric plate 1, first piezoelectric substrate 5, second piezoelectric substrate 6, third piezoelectric substrate 7, fourth piezoelectric substrate 8, all the input interdigital electrodes (Tx1, Tx2, Tx3, Tx4, Tx5, Ty1, Ty2, Ty3, Ty4 and Ty5), and all the electrode groups (Gx1, Gx2, Gx3, Gx4, Gx5, Gy1, Gy2, Gy3, Gy4 and Gy5) form the panel section. First piezoelectric substrate 5, second piezoelectric substrate 6, third piezoelectric substrate 7, and fourth piezoelectric substrate 8 are not drawn in FIG. 1. Nonpiezoelectric plates 1 is made of a transparent glass plate. The phase velocity of the SAW traveling on nonpiezoelectric plate 1 alone is higher than that traveling on first piezoelectric substrate 5 alone. All the interdigital electrodes are made of an aluminum thin film, respectively. First piezoelectric substrate 5 is cemented on input interdigital electrodes (Tx1, Tx2, Tx3, Tx4 and Tx5), which are formed on a first edge of an upper end surface of nonpiezoelectric plate 1. Second piezoelectric substrate 6 is cemented on electrode groups (Gx1, Gx2, Gx3, Gx4 and Gx5), which are formed on a second edge of the upper end surface of nonpiezoelectric plate 1. Third piezoelectric substrate 7 is cemented on input interdigital electrodes (Ty1, Ty2, Ty3, Ty4 and Ty5), which are formed on a third edge of the upper end surface of nonpiezoelectric plate 1. Fourth piezoelectric substrate 8 is cemented on electrode groups (Gy1, Gy2, Gy3, Gy4 and Gy5), which are formed on a fourth edge of the upper end surface of nonpiezoelectric plate 1. It is possible to use a one-body structure with a window-flame shape, in place of first piezoelectric substrate 5, second piezoelectric substrate 6, third piezoelectric substrate 7, and fourth piezoelectric substrate 8.

Figure 2:
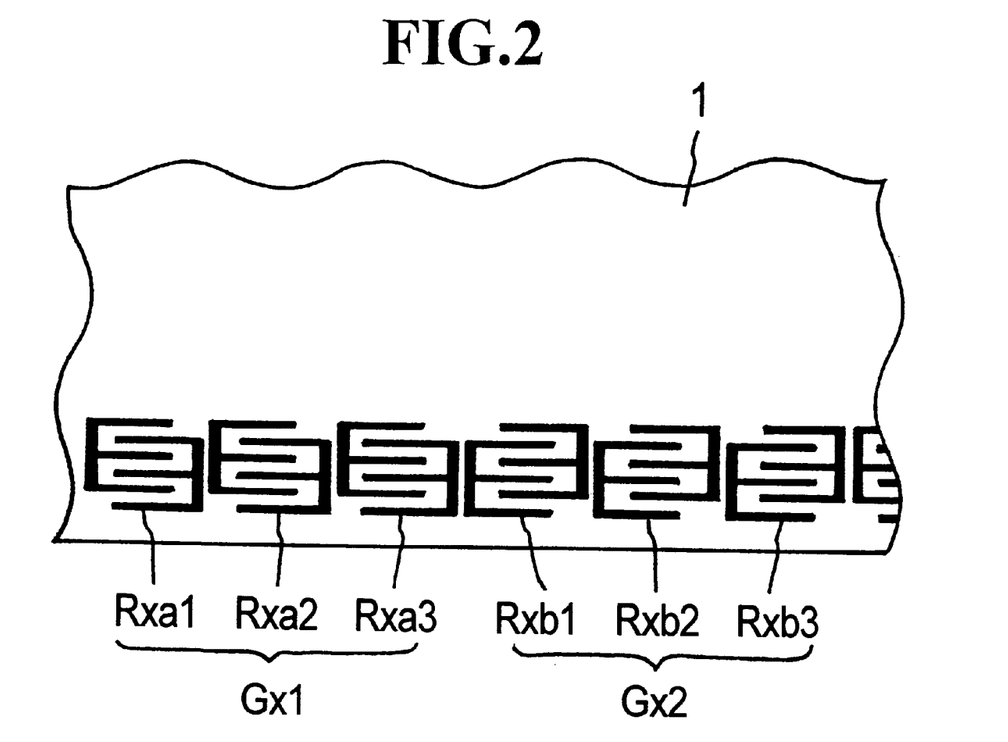
FIG. 2 shows a fragmentary top plan view, on an enlarged scale, of the panel section.

FIG. 2 shows a fragmentary top plan view, on an enlarged scale, of the panel section. Only electrode groups (Gx1 and Gx2) on the upper end surface of nonpiezoelectric plate 1 are drawn in FIG. 2. As mentioned above, electrode group Gx1 corresponding to input interdigital electrode Tx1 consists of output interdigital electrodes (Rxa1, Rxa2 and Rxa3), and electrode group Gx2 corresponding to input interdigital electrode Tx2 consists of output interdigital electrodes (Rxb1, Rxb2 and Rxb3). All the input interdigital electrodes (Tx1, Tx2, Tx3, Tx4, Tx5, Ty1, Ty2, Ty3, Ty4 and Ty5) with the same construction pattern have an interdigital periodicity of 400 μm, respectively. All the electrode groups (Gx1, Gx2, Gx3, Gx4, Gx5, Gy1, Gy2, Gy3, Gy4 and Gy5) with the same construction pattern have an interdigital periodicity of 400 μm, respectively. However, output interdigital electrodes (Rxa1, Rxa2 and Rxa3) have the reverse electrode-finger directions from output interdigital electrodes (Rxb1, Rxb2 and Rxb3). In the same way, output interdigital electrodes (Rya1, Rya2 and Rya3) have the reverse electrode-finger directions from output interdigital electrodes (Ryb1, Ryb2 and Ryb3).

Figure 3:
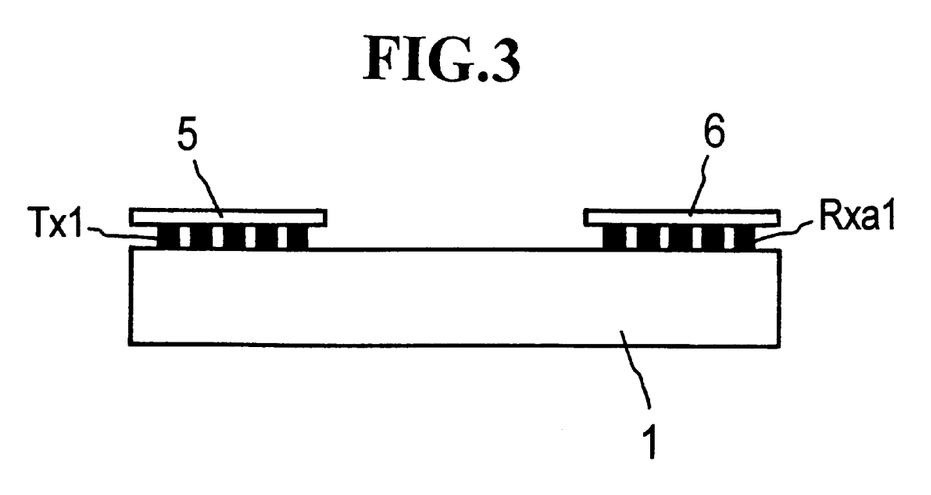
FIG. 3 shows a sectional view of the panel section.

FIG. 3 shows a sectional view of the panel section. Nonpiezoelectric plate 1 has a dimension of 1.5 mm in thickness. First piezoelectric substrate 5, second piezoelectric substrate 6, third piezoelectric substrate 7, and fourth piezoelectric substrate 8 are made of a piezoelectric ceramic thin plate with a dimension of 150 μm in thickness, respectively, and the polarization axis thereof is parallel to the thickness direction thereof.

Figure 4:
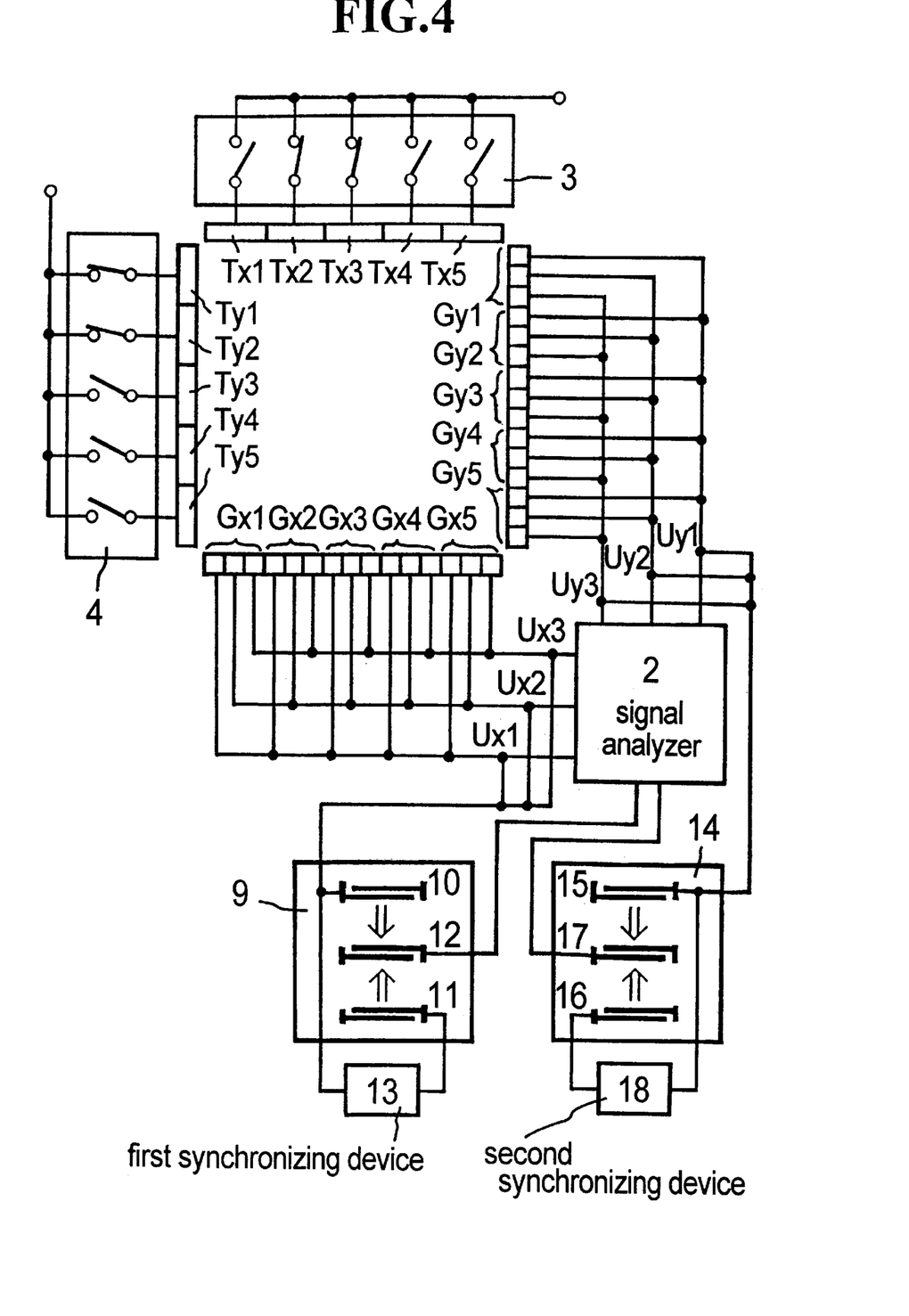
FIG. 4 shows a schematic illustration of the ultrasonic touch panel system according to an embodiment of the present invention.

FIG. 4 shows a schematic illustration of the ultrasonic touch panel system according to an embodiment of the present invention. Nonpiezoelectric plate 1, first piezoelectric substrate 5, second piezoelectric substrate 6, third piezoelectric substrate 7, and fourth piezoelectric substrate 8 are not drawn in FIG. 4. The first detecting-unit comprises fifth piezoelectric substrate 9, first interdigital electrode pair 10, second interdigital electrode pair 11, third interdigital electrode pair 12, and first synchronizing device 13. First interdigital electrode pair 10, second interdigital electrode pair 11, and third interdigital electrode pair 12 are formed on fifth piezoelectric substrate 9. The second detecting-unit comprises sixth piezoelectric substrate 14, fourth interdigital electrode pair 15, fifth interdigital electrode pair 16, sixth interdigital electrode pair 17, and second synchronizing device 18. Fourth interdigital electrode pair 15, fifth interdigital electrode pair 16, and sixth interdigital electrode pair 17 are formed on sixth piezoelectric substrate 14.

In the ultrasonic touch panel system in FIG. 4, if a first input electric signal, with a frequency approximately corresponding to an interdigital periodicity of the input interdigital electrodes is applied to input interdigital electrodes (Tx1 and Tx2), simultaneously via first switch 3, a first SAW is excited at input interdigital electrodes (Tx1 and Tx2), respectively, in first piezoelectric substrate 5. In this time, because first piezoelectric substrate 5 is made of a piezoelectric ceramic and the polarization axis thereof is parallel to the thickness direction thereof, the first SAW is effectively excited in first piezoelectric substrate 5. In addition, if the phase velocity of the first SAW is approximately the same as that of the Rayleigh wave traveling on nonpiezoelectric plate 1 alone, the first input electric signal is effectively transduced to the first SAW.

The first SAW excited in first piezoelectric substrate 5 is effectively transmitted to second piezoelectric substrate 6 along the upper end surface of nonpiezoelectric plate 1 without a leakage of the first SAW on the inside of nonpiezoelectric plate 1, because (1) the thickness of first piezoelectric substrate 5 is smaller than the interdigital periodicity of the input interdigital electrodes, (2) the thickness of nonpiezoelectric plate 1 is larger than three times the interdigital periodicity, and (3) nonpiezoelectric plate 1 is made of the glass, in which the phase velocity of the first SAW traveling on nonpiezoelectric plate 1 alone is higher than that traveling on first piezoelectric substrate 5 alone. And then, the first SAW transmitted to second piezoelectric substrate 6 is transduced to a first output electric signal at output interdigital electrodes (Rxa1, Rxa2 and Rxa3) of electrode group Gx1, and at output interdigital electrodes (Rxb1, Rxb2 and Rxb3) of electrode group Gx2, respectively. In this time, a phase of the first output electric signal at output interdigital electrodes (Rxa1, Rxa2 and Rxa3) of electrode group Gx1 and that at output interdigital electrodes (Rxb1, Rxb2, and Rxb3) of electrode group Gx2 are reverse from each other. Therefore, no electric signal appears at uniting terminals (Ux1, Ux2 and Ux3). In general, when the first input electric signal is applied to two neighbors of input interdigital electrodes (Tx1, Tx2, Tx3, Tx4 and Tx5), the first SAW is excited at the corresponding two of input interdigital electrodes (Tx1, Tx2, Tx3, Tx4 and Tx5), in first piezoelectric substrate 5. The first SAW is transduced to a first output electric signal at output interdigital electrodes (Rxa1, Rxa2 and first output electric signal at output interdigital electrodes (Rxa1, Rxa2 and Rxa3) included in the corresponding one of electrode groups (Gx1, Gx3 and Gx5) and at output interdigital electrodes (Rxb1, Rxb2 and Rxb3) included in the corresponding one of electrode groups (Gx2 and Gx4). In this way, fifteen first-SAW lanes are formed between input interdigital electrodes (Tx1, Tx2, Tx3, Tx4 and Tx5) and electrode groups (Gx1, Gx2, Gx3, Gx4 and Gx5) in all.

If a second input electric signal is applied to two neighbors of input interdigital electrodes (Ty1, Ty2, Ty3, Ty4 and Ty5), simultaneously via second switch 4, a second SAW is excited at the corresponding two of input interdigital electrodes (Ty1, Ty2, Ty3, Ty4 and Ty5), respectively, in third piezoelectric substrate 7. The second SAW is effectively transmitted to fourth piezoelectric substrate 8 along the upper end surface of nonpiezoelectric plate 1 without a leakage of the second SAW on the inside of nonpiezoelectric plate 1. And then, the second SAW is transduced to a second output electric signal at output interdigital electrodes (Rya1, Rya2 and Rya3) included in the corresponding one of electrode groups (Gy1, Gy3 and Gy5) and at output interdigital electrodes (Ryb1, Ryb2 and Ryb3) included in the corresponding one of electrode groups (Gy2 and Gy4). In this time, no electric signal appears at uniting terminals (Uy1, Uy2 and Uy3). In this way, fifteen second-SAW lanes are formed between input interdigital electrodes (Ty1, Ty2, Ty3, Ty4 and Ty5) and electrode groups (Gy1, Gy2, Gy3, Gy4 and Gy5) in all.

In the ultrasonic touch panel system in FIG. 4, if touching nowhere on the upper end surface of nonpiezoelectric plate 1, no delayed electric signal appears at all the uniting terminals, because the phases of the output electric signals at two neighbors of the electrode groups are reverse from each other. However, if touching anywhere on the upper end surface of nonpiezoelectric plate 1, a first delayed electric signal appears at one of uniting terminals (Ux1, Ux2 and Ux3), and a second delayed electric signal appears at one of uniting terminals (Uy1, Uy2 and Uy3). For example, if touching a cross point of the first-SAW lane between input interdigital electrode Tx2 and output interdigital electrode Rxb3 of electrode group Gx2, and the second-SAW lane between input interdigital electrode Ty1 and output interdigital electrode Rya2 of electrode group Gy1, the first delayed electric signal appears at uniting terminal Ux3 when the first input electric signal is applied to input interdigital electrodes (Tx2 and Tx3), and the second delayed electric signal appears at uniting terminal Uy2 when the second input electric signal is applied to input interdigital electrodes (Ty1 and Ty2). In other words, the first delayed electric signal corresponding to the first output electric signal at output interdigital electrode Rxa3 of electrode group Gx3 appears at uniting terminal Ux3, and the second delayed electric signal corresponding to the second output electric signal at output interdigital electrode Ryb2 of electrode group Gy2 appears at uniting terminal Uy2, because the first SAW on the first-SAW lane between input interdigital electrode Tx2 and output interdigital electrode Rxb3 of electrode group Gx2, and the second SAW on the second-SAW lane between input interdigital electrode Ty1 and output interdigital electrode Rya2 of electrode group Gy1 disappear by touching the cross point. Thus, the first delayed electric signal appearing at one of uniting terminals (Ux1, Ux2 and Ux3), and the second delayed electric signal appearing at one of uniting terminals (Uy1, Uy2 and Uy3) are detected at signal analyzer 2.

In order to distinguish a phase condition of the first delayed electric signal, the first detecting-unit is available. The first delayed electric signal arrives not only at signal analyzer 2, but also at first interdigital electrode pair 10, and second interdigital electrode pair 11 via first synchronizing device 13. When the first delayed electric signal is applied to first interdigital electrode pair 10 and second interdigital electrode pair 11, third- and fourth SAWs are excited on fifth piezoelectric substrate 9, respectively. The fourth SAW takes a form of burst signal with the same phase state via first synchronizing device 13. The third- and fourth SAWs arrive at third interdigital electrode pair 12 simultaneously. As a result, the first delayed electric signal is converted into a first burst-signal at third interdigital electrode pair 12. The first burst-signal arrives at signal analyzer 2, and an amplitude condition thereof is clarified. The amplitude condition of the first burst-signal indicates which of two neighbors of electrode groups (Gx1, Gx2, Gx3, Gx4 and Gx5) causes the first delayed electric signal appearing at one of uniting terminals (Ux1, Ux2 and Ux3).

In the same way, the second detecting-unit is available for distinguishing a phase condition of the second delayed electric signal. When the second delayed electric signal is applied to fourth interdigital electrode pair 15 and fifth interdigital electrode pair 16, fifth- and sixth SAWs are excited on sixth piezoelectric substrate 14, respectively. The fifth SAW SAW arrives at sixth interdigital electrode pair 17 via second synchronizing device 18. As a result, the second delayed electric signal is converted into a second burst-signal at sixth interdigital electrode pair 17. The second burst-signal arrives at signal analyzer 2, and an amplitude condition thereof is clarified. The amplitude condition of the second burst-signal indicates which of two neighbors of electrode groups (Gy1, Gy2, Gy3, Gy4 and Gy5) causes the second delayed electric signal appearing at one of uniting terminals (Uy1, Uy2 and Uy3). Thus, it is possible to sense the cross point of the first-SAW lane and the second-SAW lane in terms of the phases of the first- and second delayed electric signals.

Figure 5:
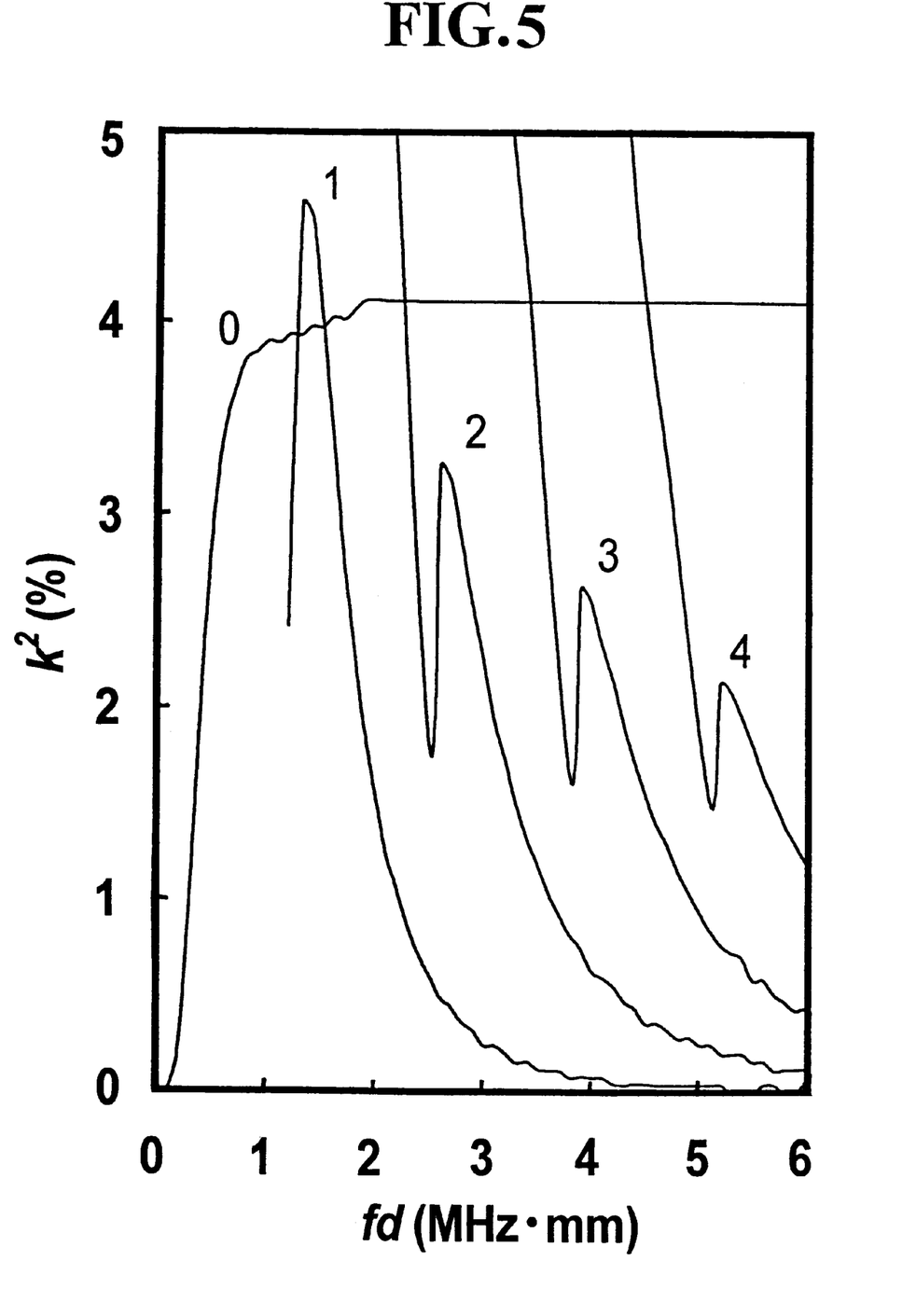
FIG. 5 shows a relationship between the electromechanical coupling constant $k^2$ and the product fd.

FIG. 5 shows a relationship between the electromechanical coupling constant $k^2$ and the product fd, where f is the frequency of the SAW and d is the thickness of first piezoelectric substrate 5. The $k^2$ value is calculated from the difference between the phase velocity under electrically opened condition and that under electrically shorted condition of first piezoelectric substrate 5. Nonpiezoelectric plate 1 has a shear wave velocity of 3,091 m/s and a longitudinal wave velocity of 5,592 m/s. The shear- and longitudinal wave velocities in nonpiezoelectric plate 1 are approximately 1.3 times those in first piezoelectric substrate 5 alone, which has a shear wave velocity of 2,450 m/s and a longitudinal wave velocity of 4,390 m/s. It is clear from FIG. 5 that the maximum $k^2$ value at the first mode is 4.7%, when the fd value is 1.3 MHz·mm. In other words, the first mode SAW is most effectively excited in first piezoelectric substrate 5, and then, the fd value is 1.3 MHz·mm.

Figure 6:
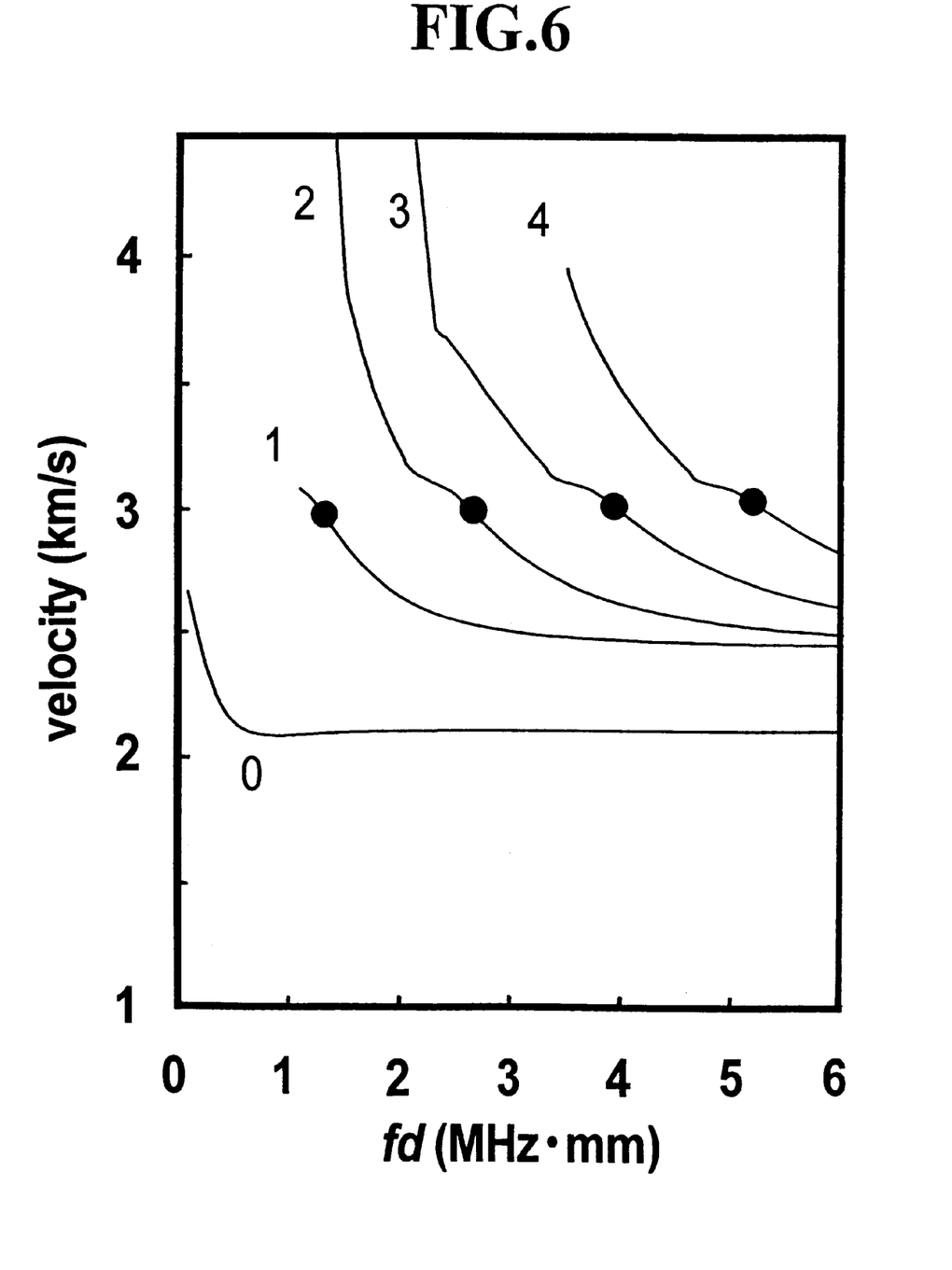
FIG. 6 shows the phase velocity curves of the SAW in the layered substrate composed of first piezoelectric substrate 5 and nonpiezoelectric plate 1.

FIG. 6 shows the phase velocity curves of the SAW in the layered substrate composed of first piezoelectric substrate 5 and nonpiezoelectric plate 1. The maximum $k^2$ value, which is obtained from FIG. 5, exists at each mark ●. The phase velocity of the SAW at each mark ● is approximately 2,980 m/s. In other words, the phase velocity of the SAW is approximately the same as the phase velocity, 2,850 m/s, of the Rayleigh wave traveling on nonpiezoelectric plate 1 alone.

Figure 7:
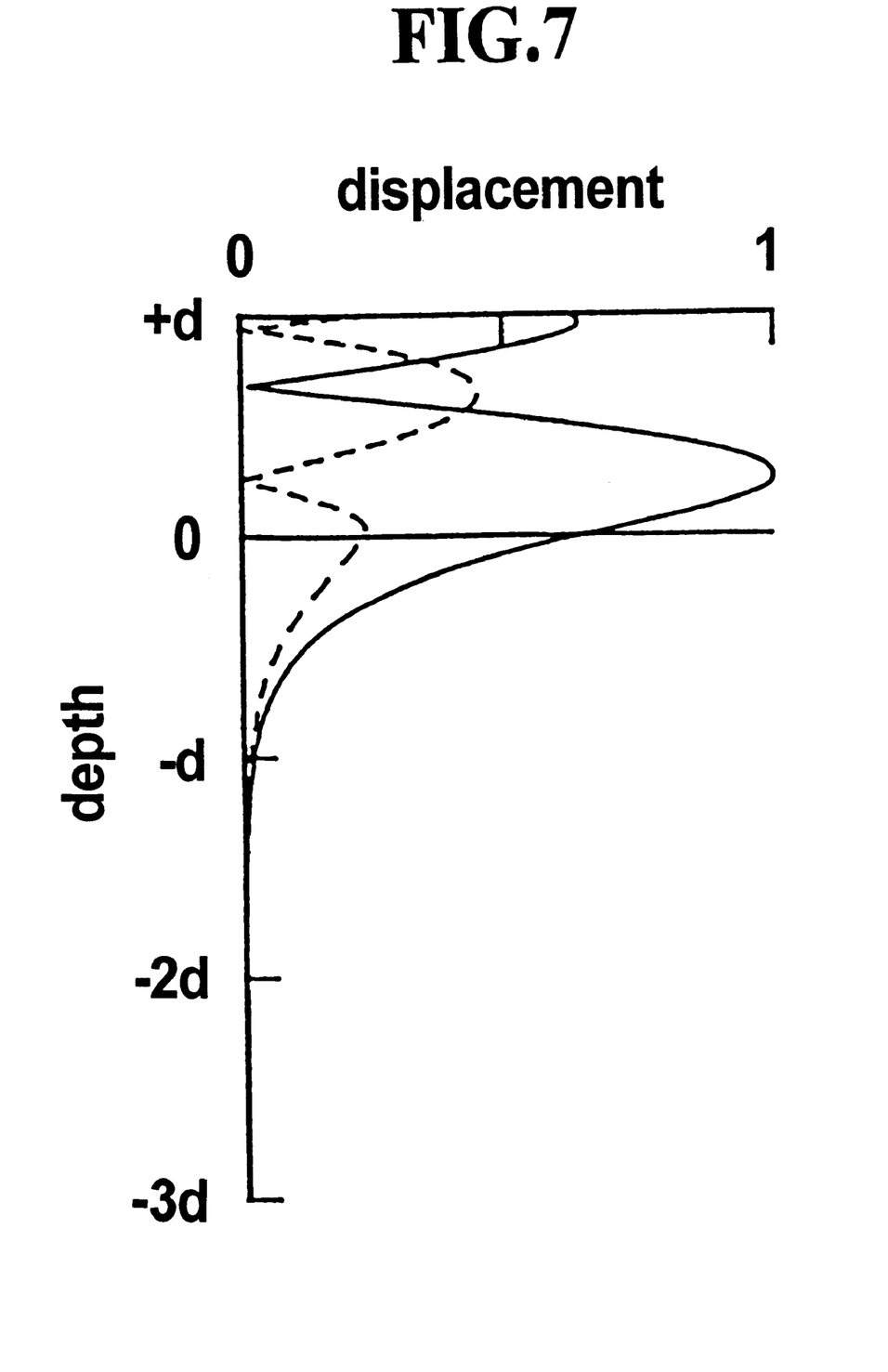
FIG. 7 shows a relationship between the normalized displacement of the SAW and the depth along the thickness direction in the layered substrate composed of first piezoelectric substrate 5 and nonpiezoelectric plate 1.

FIG. 7 shows a relationship between the normalized displacement of the first mode SAW and the depth along the thickness direction in the layered substrate composed of first piezoelectric substrate 5 and nonpiezoelectric plate 1. Continual- and dotted curves on FIG. 7 shows the displacement in the vertical direction of the SAW and that in the propagation direction thereof, respectively. It is clear that both the displacement in the vertical direction of the SAW and that in the propagation direction thereof stay near the boundary surface between first piezoelectric substrate 5 and nonpiezoelectric plate 1. In other words, the SAW is not so leaked out in the deep portion of nonpiezoelectric plate 1.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic touch panel system comprising:
   a nonpiezoelectric plate;
   a first transducer-unit consisting of
      at least two input interdigital electrodes Txi (i=1, 2, . . . , m) formed on a first edge of an upper end surface of said nonpiezoelectric plate,
      at least two electrode groups Gxi (i=1, 2, . . . , m) corresponding with said input interdigital electrodes Txi, respectively, and formed on a second edge of said upper end surface of said nonpiezoelectric plate, two neighbors of said electrode groups Gxi consisting of at least two output interdigital electrodes Rxaj (j=1, 2, . . . , n) and at least two output interdigital electrodes Rxbj (j=1, 2, . . . , n), respectively, said output interdigital electrodes Rxaj having the reverse electrode-finger directions from said output interdigital electrodes Rxbj,
      a first piezoelectric substrate cemented on said input interdigital electrodes Txi,
      a second piezoelectric substrate cemented on said electrode groups Gxi,
      at least two uniting terminals Uxj (j=1, 2, . . . , n) connected to said output interdigital electrodes Rxaj, respectively, and also to said output interdigital electrodes Rxbj, respectively;
   a second transducer-unit consisting of
      at least two input interdigital electrodes Tyi (i=1, 2, . . . , m) formed on a third edge of said upper end surface of said nonpiezoelectric plate,
      at least two electrode groups Gyi (i=1, 2, . . . , m) corresponding with said input interdigital electrodes Tyi, respectively, and formed on a second edge of said upper end surface of said nonpiezoelectric plate, two neighbors of said electrode groups Gyi consisting of at least two output interdigital electrodes Ryaj (j=1, 2, . . . , n) and at least two output interdigital electrodes Rybj (j=1, 2, . . . , n), respectively, said output interdigital electrodes Ryaj having the reverse electrode-finger directions from said output interdigital electrodes Rybj,
      a third piezoelectric substrate cemented on said input interdigital electrodes Tyi,
      a fourth piezoelectric substrate cemented on said electrode groups Gyi,
      at least two uniting terminals Uyj (j=1, 2, . . . , n) connected to said output interdigital electrodes Ryaj, respectively, and also to said output interdigital electrodes Rybj, respectively;
   a first detecting-unit consisting of
      a fifth piezoelectric substrate,
      first-, second-, and third interdigital electrode pairs formed on said fifth piezoelectric substrate,
      a first synchronizing device;
   a second detecting-unit consisting of
      a sixth piezoelectric substrate,
      fourth-, fifth-, and sixth interdigital electrode pairs formed on said sixth piezoelectric substrate,
      a second synchronizing device; and
   a signal analyzer connected to said first- and second detecting-units,
      two neighbors of said input interdigital electrodes Txi receiving a first input electric signal simultaneously, exciting a first surface acoustic wave in said first piezoelectric substrate, and transmitting said first surface acoustic wave to said second piezoelectric substrate along said upper end surface of said nonpiezoelectric plate, respectively, said output interdigital electrodes Rxaj and Rxbj transducing said first surface acoustic wave to a first output electric signal, respectively, two neighbors of said input interdigital electrodes Tyi receiving a second input electric signal simultaneously, exciting a second surface acoustic wave in said third piezoelectric substrate, and transmitting said second surface acoustic wave to said fourth piezoelectric substrate along said upper end surface of said nonpiezoelectric plate, respectively, said output interdigital electrodes Ryaj and Rybj transducing said second surface acoustic wave to a second output electric signal, respectively, said signal analyzer directly detecting a first delayed electric signal appearing at one of said uniting terminals Uxj and a second delayed electric signal appearing at one of said uniting terminals Uyj only when touching on said upper end surface of said nonpiezoelectric plate, indirectly detecting said first- and second delayed electric signals as first- and second burst-signals via said first- and second detecting-units, respectively, and sensing a touch position by distinguishing a phase condition of said first delayed electric signal appearing at said one of said uniting terminals Uxj and that of said second delayed electric signal appearing at said one of said uniting terminals Uyj.

2. An ultrasonic touch panel system as defined in claim 1, wherein said first-, second-, third-, and fourth piezoelectric substrates form a one-body structure with a window-flame shape.

3. An ultrasonic touch panel system as defined in claim 1, wherein said first-, second-, third-, fourth-, fifth-, and sixth piezoelectric substrates are made of a piezoelectric ceramic, respectively, the polarization axis thereof being parallel to the thickness direction thereof.

4. An ultrasonic touch panel system as defined in claim 1, wherein said nonpiezoelectric plate is transparent.

5. An ultrasonic touch panel system as defined in claim 1, wherein said first-, second-, third-, and fourth piezoelectric substrates have a thickness smaller than an interdigital periodicity of said input interdigital electrodes Txi and Tyi, and said nonpiezoelectric plate has a thickness larger than three times said interdigital periodicity.

6. An ultrasonic touch panel system as defined in claim 1, wherein the phase velocity of the surface acoustic wave on said nonpiezoelectric plate alone is higher than that in said first-, second-, third-, and fourth piezoelectric substrates alone.

7. An ultrasonic touch panel system as defined in claim 1 further comprising a first switch connected with said input interdigital electrodes Txi, and a second switch connected with said input interdigital electrodes Tyi.

* * * * *